C. J. LIVERING.
HAULING AND LIFTING JACK.
APPLICATION FILED JUNE 27, 1910.
990,819.
Patented Apr. 25, 1911.
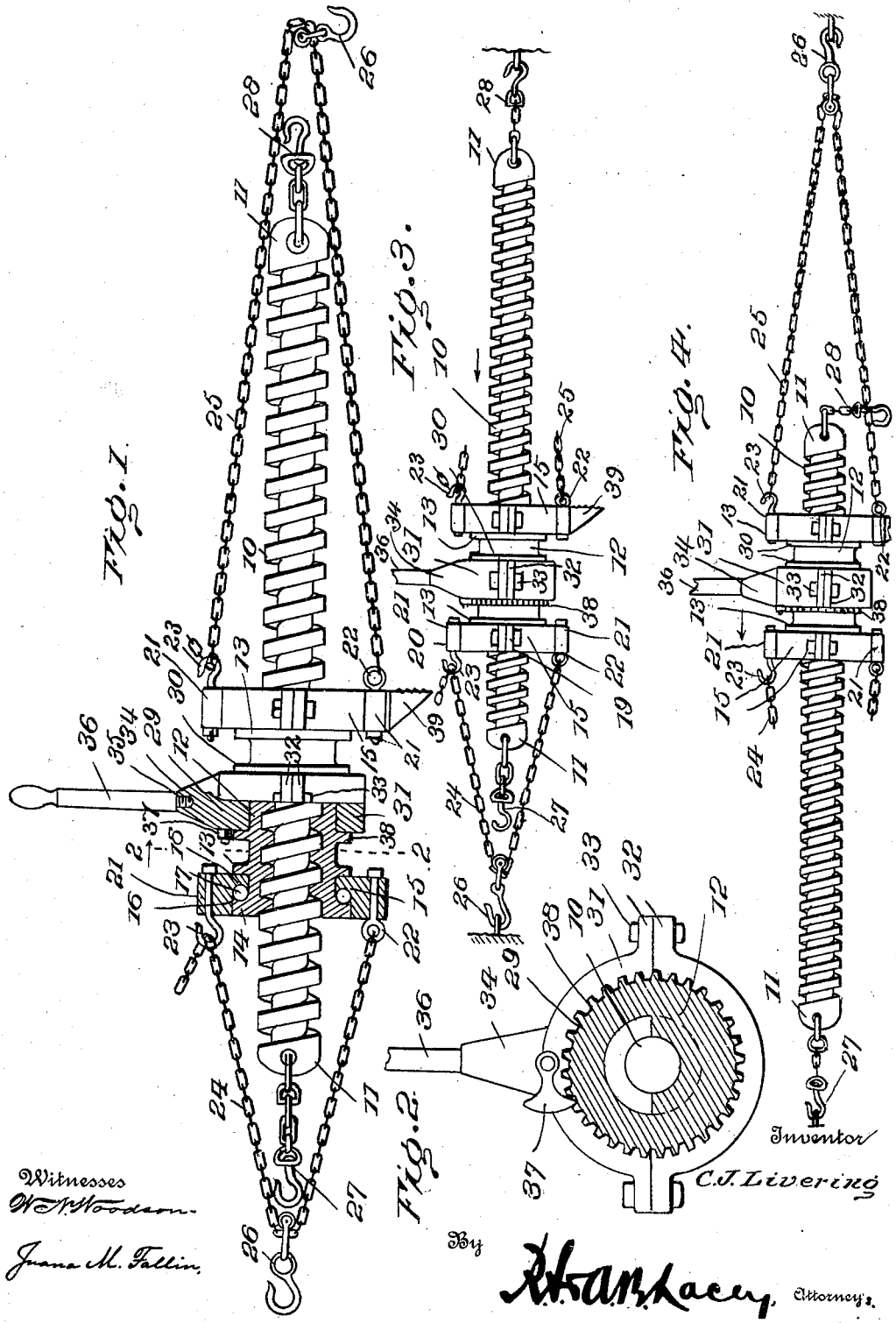

UNITED STATES PATENT OFFICE.

CHARLES JEFFERSON LIVERING, OF EDDYVILLE, KENTUCKY, ASSIGNOR OF TWO-THIRDS TO ANNIE LIVERING, OF LOUISVILLE, KENTUCKY.

HAULING AND LIFTING JACK.

990,819.

Specification of Letters Patent. Patented Apr. 25, 1911.

Application filed June 27, 1910. Serial No. 569,096.

*To all whom it may concern:*

Be it known that I, CHARLES J. LIVERING, a citizen of the United States, residing at Eddyville, in the county of Lyon and State of Kentucky, have invented certain new and useful Improvements in Hauling and Lifting Jacks, of which the following is a specification.

This invention relates to hauling and lifting devices, and has special reference to an improved hauling and lifting jack in connection with large objects and heavy weights.

The invention has for a primary object to construct a jack which substantially comprises two members rigidly connected to one another which are provided with connecting hooks at their opposite ends so that the members may be alternately attached to the anchor and to the object to be moved without the necessity of providing an additional fastening means to hold the object from backward movement while obtaining a new hold of the connecting hook.

The invention contemplates an improved jack for use in lifting sunken vessels and the like, and for use on wrecking trains when heavy objects are to be moved and but small amount of pressure is had to effect such movement. The device therefore occupies but comparatively small space and is of comparatively light weight so that it can be easily handled.

For a full understanding of the invention reference is to be had to the following description and accompanying drawing, in which:—

Figure 1 is a side elevation of the improved jack, partly in section. Fig. 2 is a section on the line 2—2 of Fig. 1. Fig. 3 is a side elevation of the improved jack showing the traveling member at one end of the draw-bar. Fig. 4 is a similar view disclosing the traveling member at the opposite ends of the draw-bar.

Corresponding and like parts are referred to in the following description and indicated in all the views of the accompanying drawing by the same reference characters.

Referring to the drawing the numeral 10 designates a draw-bar which comprises a substantially heavy rounded bar having external cross threads and provided at its opposite ends with heads 11 corresponding in size to the threads so as to form stops for a traveling member 12. The traveling member 12 is in the form of a sleeve which is internally threaded to snugly engage over the threaded portion of the draw-bar 10 and adapted for movement longitudinally over the same. The traveling member or sleeve 12 is provided at its opposite ends with outwardly extending annular flanges 13 and 14 which are spaced apart to receive therebetween attaching collars 15. The outer flanges 14 form shoulders 16 at their inner faces to receive a plurality of bearing members 17. In the present instance, the members 17 are disclosed as ball bearings, against which are seated corresponding shoulders 18 carried in the inner faces of the attaching collars 15. The attaching collars 15 are each formed of two semi-circular sections having outturned lips 19 at their meeting ends through which pass clamping bolts 20 to secure the sections in the raceway formed between the flanges 13 and 14. Intermediate of the ends of each of the sections of the attaching collars 15, transverse ribs 21 are formed which are suitably apertured to receive oppositely disposed eye-bolts 22 and hook bolts 23. Attaching chains 24 and 25 are secured to the opposite attaching collars 15 and have one end thereof secured through the eyes of the bolts 22, while their opposite or free ends are adjustably secured over the hooks of the bolts 23. An adjustable or traveling hook 26 is positioned upon each of the chains 24 and 25. The heads 11 carry swivel hooks 27 and 28 which extend outwardly from the draw-bar 10. The traveling member or sleeve 12 is provided midway of its ends with central and spaced flanges 29 and 30 forming therebetween an annular groove in the traveling member for the reception of a ring 31 for rotation in the groove.

The ring 31 is preferably formed in two sections having outturned ribs 32 at their meeting ends to receive clamping bolts 33. The upper ring section carries an outwardly extending boss 34 having a threaded socket formed in the outer end thereof to receive a correspondingly threaded shank 35 formed upon the inner end of a hand-lever 36. The hand-lever 36 projects upwardly from the jack and is thus detachably secured upon the ring 31. A reversible dog 37 is pivoted against one side of the ring 31 and at the base of the boss 34, the same overhanging the central flange 29. The flange 29 is provided in its periphery with a circular rack 38 for coöperation with the reversible dog 37.

In the operation of the device, the attaching chain 24 is anchored and the swivel hook 28 is attached to an object to be moved. The hand-lever 36 is now reciprocated to rotate the ring 31 within the groove of the traveling member 12 to carry the dog 37 loosely over the rack 38. When the hand-lever 36 reaches one end of its swinging movement, it is given an opposite movement whereupon the dog 37 meshes with the adjacent tooth of the rack and insures the rotation of the traveling member 12 upon the further movement of the hand-lever 36. The rotation of the traveling member 12 feeds the draw-bar 10 through the same and shortens the distance between the attaching chain 24 and the swivel hook 28. When the draw bar 10 passes through the traveling member 12 to dispose the head 11 against the flange 14, further movement of the draw-bar is prevented. The attaching chain 25 is now secured to the movable object and the swivel hook 27 is anchored. The swivel hook 28 and the attaching chain 24 are now released, and the dog 37 is turned over into its opposite position. The handle 36 is now operated as before when the traveling member 12 is given an opposite rotation to feed the draw-bar 10 through the traveling member 12 in an opposite direction.

It will be observed that with a device thus constructed the traveling member 12 operates to draw the object toward the anchor, while it is moving in both directions, and that it is not necessary to employ separate means which hold the moving object in position while the traveling member is carried back to the opposite end of the draw-bar or its initial position.

The device can be made in different sizes to adapt the same to various objects to which it is applied, and it can be seen that considerable drawing power is had with the expenditure of comparatively small working power.

One of the attaching collars 15 is provided with a heel 39 extending radially from one side thereof and having a roughened outer face to receive an object to be raised when the device is used as a lifting jack.

Having thus described the invention what is claimed as new is:—

1. A hauling and lifting jack including a threaded draw-bar, an internally threaded sleeve engaging over the draw-bar, attaching hooks carried at the opposite ends of the draw-bar, attaching chains carried upon the opposite ends of the sleeve, and means for rotating the sleeve about the draw-bar.

2. A jack including a threaded draw-bar, a traveling member disposed in threaded relation over the draw-bar, attaching hooks carried upon the ends of the draw-bar, attaching collars mounted for rotation upon the opposite ends of the traveling member, attaching chains adjustably secured upon the collars, and operating means carried upon the central portion of the traveling member for intermittently rotating the same in opposite directions.

3. A jack including a draw-bar, a traveling member mounted on the draw-bar, means for rotating the traveling member in opposite directions to reciprocate the draw-bar, and attaching means carried upon the opposite ends of the draw-bar and the traveling member.

4. A hauling and lifting jack including a threaded draw-bar having heads upon its opposite ends, swivel hooks carried upon the heads, a traveling member disposed in threaded relation over the draw-bar, attaching collars carried upon the opposite ends of the traveling member, attaching chains adjustably carried upon the collars, a ring mounted for rotation about the traveling member, a dog carried upon the ring, and an operating handle extending outwardly from the ring to effect the rotation thereof.

5. A hauling and lifting jack including a draw-bar, a sleeve disposed in threaded relation upon the draw-bar, said sleeve having spaced flanges adjacent its opposite ends and having an annular groove formed midway of its ends, attaching collars disposed between the flanges and at the opposite ends of the sleeve, attaching chains carried by the collars, a ring mounted for rotation in the groove about the sleeve, said sleeve also having a segmental rack formed at one side of the ring, a reversible dog pivoted against the side of the ring for coöperation with the rack, a handle extending outwardly from one side of the ring for reciprocating the same, and swivel hooks carried upon the opposite ends of the draw-bar.

6. A hoisting and lifting jack including a threaded draw-bar having heads upon its opposite extremities, a traveling member arranged in threaded relation upon the draw-bar and limited in movement by the heads, attaching collars mounted for rotation upon the opposite ends of the traveling member, chains carried by the collars, a ring mounted for rotation centrally upon the traveling member, means disposed between the ring and the traveling member for effecting the rotation of the traveling member in opposite directions, and attaching hooks carried upon the heads of the draw-bar.

7. A jack including a draw-bar, a traveling member arranged upon the draw-bar for reciprocation thereover, attaching collars loosely mounted upon the ends of the traveling member, attaching chains adjustably secured upon the outer collars, means carried by the traveling member for rotating the same in opposite directions, and swivel hooks mounted upon the opposite ends of the draw-bar.

In testimony whereof, I affix my signature in presence of two witnesses.

CHARLES JEFFERSON LIVERING. [L. S.]

Witnesses:
 HENRY T. HAGERMAN,
 JOSEPH H. SMITH.

Copies of this patent may be obtained for five cents each, by addressing the "Commissioner of Patents, Washington, D. C."